Oct. 18, 1949.  I. W. TERRY  2,485,334
UNIVERSAL PUSH BEAM FOR IMPLEMENTS
Filed Feb. 3, 1947  2 Sheets-Sheet 1
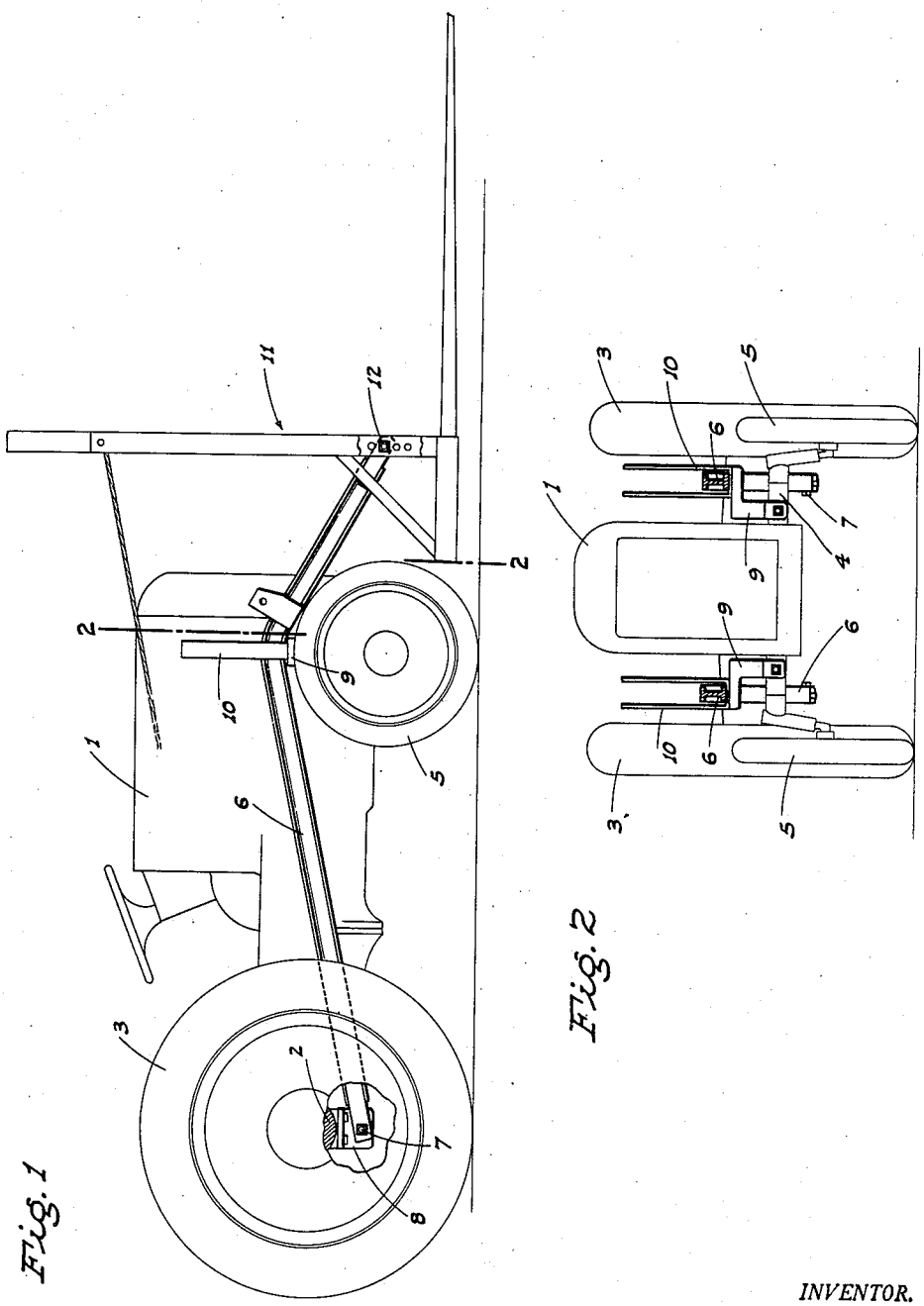
INVENTOR.
Irl W. Terry
BY
ATTYS Oct. 18, 1949.  I. W. TERRY  2,485,334
UNIVERSAL PUSH BEAM FOR IMPLEMENTS
Filed Feb. 3, 1947  2 Sheets-Sheet 2

INVENTOR.
Irl W. Terry
BY
ATTYS

Patented Oct. 18, 1949

2,485,334

UNITED STATES PATENT OFFICE 2,485,334

UNIVERSAL PUSH BEAM FOR IMPLEMENTS

Irl W. Terry, Manteca, Calif.

Application February 3, 1947, Serial No. 726,141

8 Claims. (Cl. 280—33.13)

This invention is directed to, and it is an object to provide, an improved push beam assembly for mounting a front end implement on a wheel type tractor.

Another object of the invention is to provide a push beam assembly especially designed for use on a wheel type farm tractor to conveniently and effectively mount implements thereon, such as a buck rake or hay loader, manure loader, bulldozer blade, ditcher, or similar farm tools.

A further object of the invention is to provide a push beam assembly, for the purpose described, which is arranged to permit of relative vertical floating of the implement and the tractor; this being a desirable feature, especially when uneven ground is traversed, because the implement or tractor can relatively rise or fall without imposing any undue strain on the same.

An additional object of the invention is to provide a push beam assembly which includes a vertically adjustable, implement mounting extension adapted to attach at the forward end of said assembly; such extension being vertically adjustable by an included fluid pressure actuated power cylinder.

A further object of the invention is to provide an effective universal push beam for implements, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the push beam assembly as mounted on a tractor and supporting a buck rake.

Fig. 2 is a cross section on line 2—2 of Fig. 1.

Figure 3:
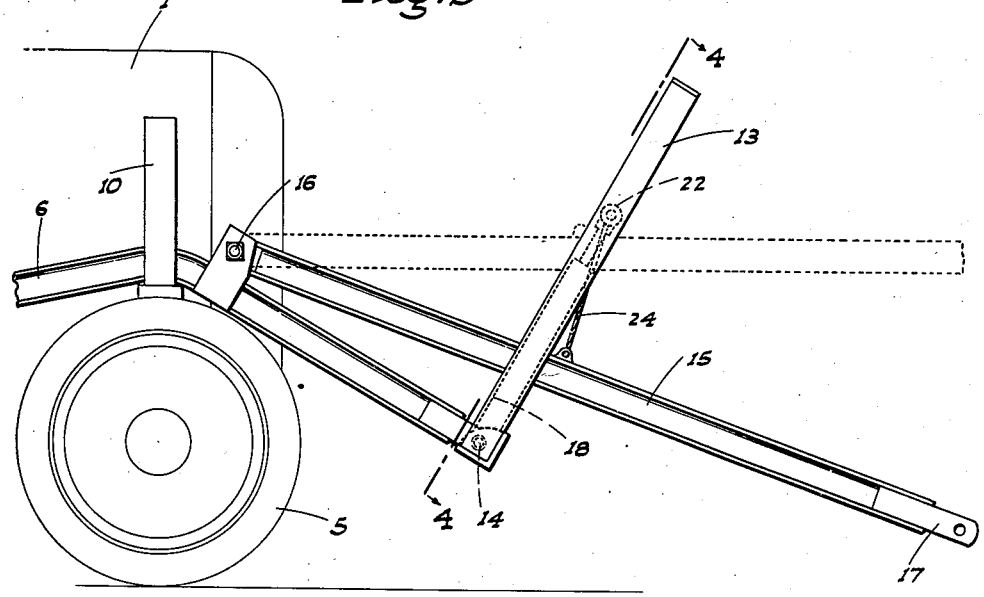
Fig. 3 is an enlarged fragmentary elevation of the front portion of the push beam assembly including the implement mounting extension thereon.

Referring now more particularly to the characters of reference on the drawings, and at present to Figs. 1 and 2, the improved push beam assembly is here shown as mounted in connection with a wheeled tractor 1 of the farm type, which includes a rear axle 2, rear drive wheels 3, a front axle 4, and steerable front wheels 5.

The push beam assembly comprises a pair of rigid, heavy-duty push beams 6 disposed on opposite sides of the tractor. At their rear end portions the push beams 6 are disposed between the tractor frame and the rear wheels 2, being detachably pivotally connected, as at 7, to brackets 8 fixed in connection with, and depending from, said axle 2.

From their point of rear end connection with the brackets 8, the push beams 6 extend at a forward and upward incline to a point above the axle 4 and thence project at a forward and downward incline to a front end termination ahead of the wheels 5 and above the ground. The push beams 6 are thus generally of arched configuration, with the crown of the arch directly over the axle 4.

Laterally inwardly of the wheels 5, and on each side of the tractor, the axle 4 is fitted with an upstanding bracket 9, each of which includes a vertically elongated cradle 10 in which the adjacent push beam 6 rests, whereby said push beams and the tractor are capable of free relative vertical floating motion. When the push beams 6 rest on the bottom of the cradles 10, they are at sufficient elevation adjacent the front wheels 5 to permit of free steering of the latter thereunder.

For certain types of front end implements, such as a buck rake, indicated generally at 11, such implement is mounted directly in connection with the front ends of the push beams 6; the point of attachment being shown at 12.

With a front end implement, such as a buck rake, mounted as above described, the implement and the tractor, particularly when traversing uneven ground, each can float free and relative to the other, which is desirable for the reason that no undue stresses or strains are imparted to either the implement or the tractor.

The particular arrangement and mounting of the push beams 6 is of advantage, for the reason that the thrust is imparted to the implement 11 directly from the rear axle 2.

Also, the specific angular or arch form of the push beams is highly advantageous in that by thus overhanging the front wheels, it avoids the necessity of spreading said wheels laterally to accommodate the beams, something which must be done with conventional push beam assemblies.

Figure 4:
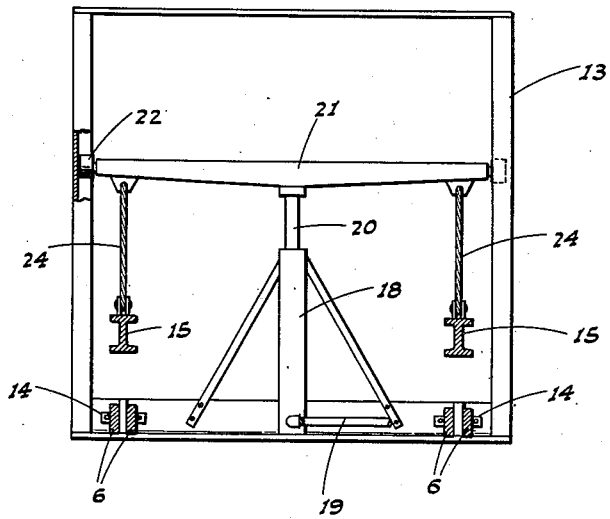
Fig. 4 is a cross section on line 4—4 of Fig. 3.

For certain types of front end implements which require vertical adjustment, there is provided the following implement mounting extension for the push beam assembly, and in this connection reference is now made particularly to Figs. 3 and 4.

The implement mounting extension for the push beam assembly comprises an open upstanding rectangular frame 13 fixed, at its lower end, in connection with the front ends of the push beams 6, as at 14; the frame 13 being rigid but detachably secured.

A pair of extension beams 15 corresponding to the push beams, 6, and disposed in part directly above the forward end portions of the latter, are pivotally connected thereto at their rear ends, as at 16, and thence extend forwardly through the rectangular frame 13 in free floating relation adjacent opposite sides of the latter. At their forward ends, which are disposed some distance ahead of the frame 13, the extension beams 15 are fitted with attachment members 17 adapted for connection with the front end implement (not here shown), which may be a hay loader, manure loader, bulldozer blade, ditcher, or a similar farm tool.

It will be seen that the thrust of the tractor is imparted from the push beams 6 through the extension beams 15 to the implement mounted on the front end of said latter beams. These extension beams are vertically adjustable, whereby to effect like adjustment of the implement in the following manner:

A fluid pressure actuated power cylinder 18 is mounted in the rectangular frame 13 centrally of its sides and upstanding from the bottom of said frame; such cylinder being suitably braced, and controlled through the medium of a fluid pressure system leading forwardly from the tractor, and shown in part at 19. This fluid pressure system is valve controlled by the tractor operator.

The power cylinder 18 includes an upstanding piston rod 20 secured to a cross head 21 having rollers 22 on its opposite ends running in channel sides 23 of the frame 13. Flexible suspension cables 24 connect between opposite end portions of the cross head 21 and the extension beams 15 intermediate their ends.

Upon operation of the power cylinder 18 to advance or retract the piston rod 20, the extension beams 15, and implement mounted thereon, are raised or lowered, respectively, at the selection of the tractor operator.

From the foregoing description, it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A push beam assembly for mounting a front end implement on a wheel type tractor, comprising a pair of transversely spaced push beams, means adapted to pivotally connect the push beams to the tractor adjacent its rear end and on opposite sides thereof for free floating vertical swinging motion relative to the tractor, and means adapted to mount an implement in connection with the front ends of the push beams ahead of the tractor; there being guide cradles adapted to mount on opposite sides of the tractor adjacent its front end, and the push beams riding in said cradles in their free floating relation.

2. A push beam assembly for mounting a front end implement on a wheel type tractor, comprising a pair of transversely spaced push beams, means adapted to pivotally connect the push beams to the tractor adjacent its rear end and on opposite sides thereof for free floating vertical swinging motion relative to the tractor, and means adapted to mount an implement in connection with the front ends of the push beams ahead of the tractor; the push beams being arched in clearance relation above the front axle of the tractor, and guide cradles adapted to mount on opposite sides of the tractor and to receive the arched portions of the push beams in their free floating relation.

3. A push beam assembly for mounting a front end implement on a wheel type tractor, comprising a pair of transversely spaced push beams, means adapted to pivotally connect the push beams to the tractor adjacent its rear end and on opposite sides thereof for vertical swinging motion, and means adapted to mount an implement in connection with the front ends of the push beams ahead of the tractor; the push beams being arched in clearance relation above the front axle of the tractor, and guide cradles adapted to mount on opposite sides of the tractor and to receive the arched portions of the push beams in free floating relation, said cradles including brackets for attachment to said front axle.

4. A push beam assembly for mounting a front end implement on a wheel type tractor, comprising a pair of transversely spaced push beams, means adapted to pivotally connect the push beams to the tractor adjacent its rear end and on opposite sides thereof for free floating vertical swinging motion relative to the tractor, the front end portions of the push beams projecting ahead of the tractor, a vertically upstanding frame connecting the front ends of the push beams, a pair of vertically swingable extension beams pivoted at their rear ends to corresponding push beams short of the frame and projecting forwardly to a termination ahead of the same, and means between the frame and extension beams to vertically adjust the latter.

5. A push beam assembly for mounting a front end implement on a wheel type tractor, comprising a pair of transversely spaced push beams, means adapted to pivotally connect the push beams to the tractor adjacent its rear end and on opposite sides thereof for free floating vertical swinging motion relative to the tractor, the front end portions of the push beams projecting ahead of the tractor, a vertically upstanding frame connecting the front ends of the push beams, a pair of vertically swingable extension beams pivoted at their rear ends to corresponding push beams short of the frame and projecting forwardly to a termination ahead of the same, and power means between the frame and extension beams to vertically adjust the latter as a unit.

6. A push beam assembly, as in claim 5, in which the power means is a fluid pressure actuated power cylinder connected at one end to the frame intermediate the beams, a cross head on the other end of the power cylinder, and connecting elements between opposite ends of the cross head and the extension beams intermediate their ends.

7. A push beam assembly for mounting a front end implement on a wheel type tractor, comprising a pair of transversely spaced push beams, means adapted to pivotally connect the push beams to the tractor adjacent its rear end and on opposite sides thereof for vertical swinging motion, the front end portions of the push beams projecting ahead of the tractor at a forward and downward incline, an open, upstanding frame connecting the front ends of the push beams in rigid relation, a pair of vertically swingable extension beams pivoted at their rear ends to corresponding push beams short of the frame and projecting forwardly through the latter to a front end termination therebeyond, and power means between the frame and extension beams to vertically adjust the latter.

8. A push beam assembly for mounting a front end implement on a wheel type tractor, comprising a pair of transversely spaced push beams, means adapted to pivotally connect the push beams to the tractor adjacent its rear end and on opposite sides thereof for vertical swinging motion, the front end portions of the push beams projecting ahead of the tractor at a forward and downward incline, an open, upstanding frame connecting the front ends of the push beams in rigid relation, a pair of vertically swingable extension beams pivoted at their rear ends to corresponding push beams short of the frame and projecting forwardly through the latter to a front end termination therebeyond, and power means between the frame and extension beams to vertically adjust the latter; said last named means being a vertically mounted power cylinder in the frame, a cross head on the cylinder, and connecting elements between the cross head and extension beams.

IRL W. TERRY.

REFERENCES CITED

The following references are of record in the file of this patent:

UNITED STATES PATENTS

| Number | Name | Date |
|---|---|---|
| 1,383,184 | Borland | June 28, 1921 |
| 1,477,136 | Laurie | Dec. 11, 1923 |
| 2,173,406 | Wilkinson | Sept. 19, 1939 |